No. 854,816. PATENTED MAY 28, 1907.
C. C. FARMER.
LOAD BRAKE APPARATUS.
APPLICATION FILED SEPT. 10, 1904.
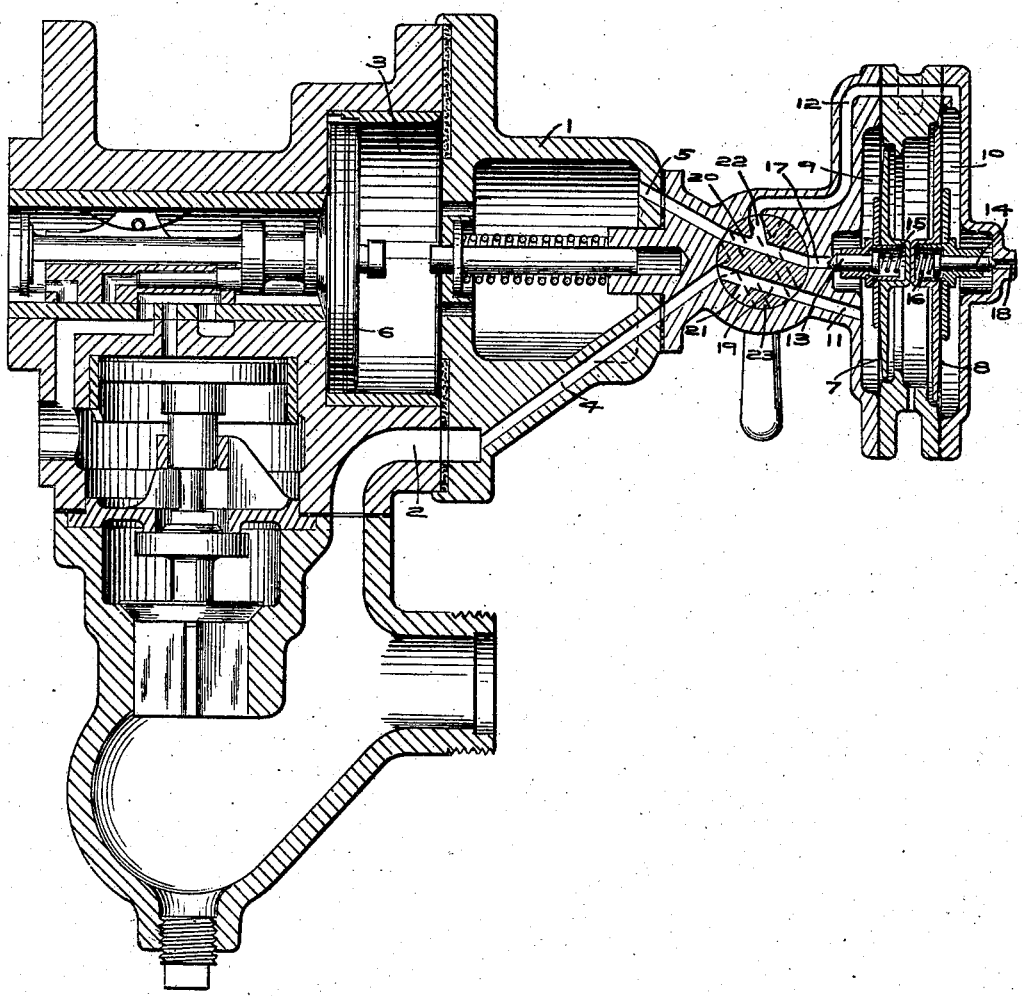
WITNESSES
INVENTOR
Att'y.

UNITED STATES PATENT OFFICE.

CLYDE C. FARMER, OF CHICAGO, ILLINOIS, ASSIGNOR TO THE WESTINGHOUSE AIR BRAKE COMPANY, OF PITTSBURG, PENNSYLVANIA, A CORPORATION OF PENNSYLVANIA.

LOAD BRAKE APPARATUS.

No. 854,816.  Specification of Letters Patent.  Patented May 28, 1907.

Application filed September 10, 1904. Serial No. 223,970.

*To all whom it may concern:*

Be it known that I, CLYDE C. FARMER, a citizen of the United States, residing in Chicago, county of Cook, and State of Illinois, have invented a certain new and useful Improvement in Load Brake Apparatus, of which the following is a specification.

This invention relates to fluid pressure brakes, and more particularly to apparatus of this character which may be adapted to give light braking power upon a car when empty and heavy braking power upon the car when loaded.

It is a well known fact that in order to secure the most efficient braking the power with which the brakes are applied should be in proportion to the weight of the load on the car, that is, a much greater braking pressure may be applied to the brake shoes when the car is heavily loaded than when the car is empty, and without danger of sliding the wheels. Various devices have been proposed for this purpose, that most commonly used being to carry a high pressure in the brake system sufficient to produce the proper braking pressure for the loaded cars and then apply safety or blow down valves to the brake cylinders which may be cut in on the empty cars to limit the brake cylinder pressure thereon to such a degree as may be safely applied without causing a sliding of the wheels. Such an arrangement obviously wastes a large amount of compressed air when the apparatus is set for light braking power. It has also been proposed to use an additional auxiliary reservoir or an additional brake cylinder which may be cut in for giving heavy braking power on the car when loaded, but such arrangements have involved complications in the action of the triple valve device, since the sizes of the parts and ports in these valves must be designed to operate with certain relative capacities of auxiliary reservoir and brake cylinder, consequently when the relative proportions of these volumes are varied the action of the triple valve becomes irregular and objectionable.

The main object of this invention is to provide an improved device for reducing the braking pressure produced upon the car when adjusted to light braking position, and at the same time avoid all the objectionable features of the prior art devices above mentioned.

Broadly stated, my invention comprises a reducing valve device adapted to be cut in between the train pipe and the chamber or space on the train line side of the triple valve piston for reducing or limiting the pressure admitted from the train pipe to said chamber and for maintaining a substantially constant difference in the degree of pressure carried in the train pipe and that in the auxiliary reservoir of the car brake apparatus. This difference in pressures may be made any amount desired and is adapted to be maintained both during the time of raising the train pipe pressure and also when reducing the same for the purpose of applying the brakes whereby the action of the triple valves will be uniform on both the light cars and the loaded cars, but the pressure admitted to the brake cylinders on the light cars will be less than that which obtains upon the heavy or loaded cars in proportion to lower degree of pressure carried in the auxiliary reservoir when the apparatus is set for light braking with the reducing valve device cut in.

I will now describe one form of device embodying my invention, reference being had to the accompanying drawing, which shows the device in vertical section attached to a standard quick action triple valve.

The triple valve device, with the exception of the cap, may be of the ordinary standard construction, which is well understood by all familiar with this art and needs no further description. According to the construction shown, the cap portion 1 of the triple valve is not provided with a direct communicating passage from the train pipe passage 2 to the piston chamber 3, but has a passage 4 leading from the train pipe space 2 to the cut out cock of my improved reducing valve device, and another passage 5 leading from the cut out cock to the cap chamber and space 3 on the train line side of the triple valve piston 6.

The reducing valve mechanism comprises a casing having a movable abutment, here shown as composed of the two diaphragms 7 and 8, subject to the opposing pressures of the train pipe and the piston chamber. The diaphragm chambers 9 and 10 are connected to the cut out cock by the respective ports 11 and 12, while the space between the diaphragms is open to the atmosphere. Pin valves 13 and 14 are yieldingly mounted in the hollow abutting stems of the diaphragms by means of springs 15 and 16, whereby both valves are normally closed when the opposing pressures on the diaphragms are balanced. The valve 13 controls port 17 leading from chamber 9 to the cut out cock while the valve 14 controls port 18 leading from chamber 10 to the atmosphere, and the cut out cock 23 is provided with ports 19, 20, 21 and 22 for adjusting the apparatus to produce light braking upon empty cars or heavy braking upon loaded cars.

Any desired means may be provided whereby the opposing forces upon the movable abutment may be balanced by different degrees of air pressures in the diaphragm chambers, and as here shown this is done by making the exposed area of the diaphragm 10 greater than that of diaphragm 9, whereby a higher degree of pressure in chamber 9 and the train line will be balanced by a lower degree of pressure in the chamber 10 and the triple piston chamber For present purposes the device is designed to give a difference in these pressures of about 20 to 30 pounds per square inch, although it will be readily apparent that this may be varied as desired by changing the relative exposed areas of the differential diaphragms.

The operation of my improved device is as follows: The cut out cock being adjusted to the position shown in full lines for light braking, air under pressure from the train pipe passes through passages 4, 19 and 11 to the diaphragm chamber 9 and opening valve 13 feeds through ports 17, 20 and 5 to triple piston chamber 3 and the auxiliary reservoir and also through ports 22 and 12 to the diaphragm chamber 10. As the pressure in the train pipe and chamber 9 rises to its normal maximum degree, say seventy pounds per square inch, the pressure in auxiliary reservoir, triple piston chamber and diaphragm chamber 10 will rise to a certain degree less than said maximum, say to fifty pounds per square inch, due to the differential areas of the diaphragms, for the opposing pressures are then balanced and the springs 15 and 16 hold the diaphragms in central position with both valves 13 and 14 tightly closed. Should the pressure upon the triple piston and in chamber 10 tend to rise above that of the train pipe less the given differential, the pressure upon diaphragm 8 would then open the valve 14 and permit such excess pressure to escape to the atmosphere. Also, when the train pipe pressure and consequently the pressure in chamber 9 is reduced for a service application of the brakes, the greater pressure upon diaphragm 8 immediately opens valve 14 and reduces the pressure in the chamber 3 on the train line side of the triple piston at precisely the same rate as the train pipe pressure is being reduced, thereby securing uniform action of the triple valve with the other triple valves in the train. When an emergency application is made the sudden reduction of pressure in chamber 9 causes the vent valve 14 to be opened wide so as to produce quick-action of the triple valve and the opening of the emergency valve for supplying air from the train pipe to the brake cylinder in the usual manner. When the brakes are released the increasing pressure acting upon diaphragm 7 opens the valve 13 sufficiently to allow the pressure upon the triple valve piston in chamber 3 to rise at the same rate as the train pipe, as before explained. When the device is adjusted for heavy load braking the cock 23 is turned to the position indicated in dotted lines, in which the train pipe is in free open communication with the triple valve piston chamber through ports 4, 21, 19 and 5, so that the auxiliary reservoir is charged to the maximum degree of pressure and the apparatus operates in the usual way. In this position of the cock my improved reducing valve device is entirely cut out and as the pressure therein immediately escapes to the atmosphere the diaphragms are subject to no strains. When the device is set for light braking the action of the triple valve is in all respects similar to that in heavy braking, except that on account of the lower degree of pressure carried in the triple valve and auxiliary reservoir the brake cylinder pressure which is produced at each application of the brakes is less by a certain amount than that produced on the loaded cars.

Among the advantages derived by the use of my improvement are the following: 1st. All waste of compressed air by blowing down the brake cylinder pressure upon the light cars is prevented, while at the same time the high brake cylinder pressure may be obtained upon the loaded cars. 2nd. It will permit an increase in brake cylinder pressure in emergency applications above that desirable for service applications. 3rd. The brake will apply and release uniformly with other brakes in the train. 4th. It may be applied to the present standard apparatus with scarcely any change or alteration. 5th. The device is entirely cut out and free from pressure when set in heavy braking position. 6th. Leakage under the valves cannot cause excessive pressure in the auxiliary reservoir when the device is set for light braking, for the reason that any excess from such leakage will be discharged to the atmosphere.

Having now described my invention, what I claim as new and desire to secure by Letters Patent is:—

1. In a fluid pressure brake, the combination with a triple valve, of means for reducing the pressure admitted from the train pipe to the triple valve piston and the auxiliary reservoir.

2. In a fluid pressure brake, the combination with a triple valve, of a reducing valve device interposed between the train pipe and the triple valve piston.

3. In a fluid pressure brake, the combination with a triple valve, of means for limiting the maximum pressure of the auxiliary reservoir and triple valve chamber to a degree less than that of the normal maximum train pipe pressure.

4. In a fluid pressure brake, the combination with a triple valve, of a reducing valve device interposed between the train pipe and the auxiliary reservoir for restricting the maximum pressure admitted to the auxiliary reservoir side of the triple valve piston to a certain amount less than that of the train pipe.

5. In a fluid pressure brake, the combination with a triple valve, of means for maintaining a substantially constant differential between the train pipe pressure and the pressure acting on the train line side of the triple valve piston.

6. In a fluid pressure brake, the combination with a triple valve, of a reducing valve device interposed between the train pipe and the triple valve piston chamber and having means for maintaining a substantially constant differential in the pressures of said chamber and the train pipe.

7. In a fluid pressure brake, the combination with a triple valve, of a reducing valve device interposed between the train pipe and the triple valve piston chamber and having means for varying the pressure on the train line side of the triple valve piston at substantially the same rate as the train pipe pressure is varied.

8. In a fluid pressure brake, the combination with a triple valve, of a reducing valve device interposed between the train pipe and the triple valve piston chamber and operating under a reduction in train pipe pressure to reduce the pressure in the triple valve piston chamber at substantially the same rate.

9. In a fluid pressure brake, the combination with a triple valve, of a reducing valve device interposed between the train pipe and the triple valve piston chamber, and means for cutting said reducing valve device into or out of operation.

10. In a fluid pressure brake, the combination with a triple valve, of a reducing valve device interposed between the train pipe and the triple valve piston chamber, and a cock having ports for opening free communication between the train pipe and said piston chamber or for closing said free communication and connecting the reducing valve device into operation.

11. In a fluid pressure brake, the combination with a triple valve, of a reducing valve device interposed between the train pipe and the triple valve piston chamber and comprising valve mechanism and a movable abutment subject to the opposing pressures of the train pipe and said chamber for controlling the pressure in said chamber.

12. In a fluid pressure brake, the combination with a triple valve, of a valve device having a movable abutment subject to the opposing pressures of the train pipe and the chamber on the train line side of the triple valve piston for controlling the supply of fluid from the train pipe to said chamber.

13. In a fluid pressure brake, the combination with a triple valve, of a valve device having a movable abutment subject to the opposing pressures of the train pipe and the chamber on the train line side of the triple valve piston for controlling the supply of fluid from the train pipe to said chamber, and from said chamber to the atmosphere.

14. In a fluid pressure brake, the combination with a triple valve, of a movable abutment having differential areas subject to the opposing pressures of the train pipe and the chamber on the train line side of the triple valve piston, and valve mechanism operated by said abutment for controlling the supply of fluid from the train pipe to said piston chamber.

15. In a fluid pressure brake, the combination with a triple valve, of a movable abutment having differential areas subject to the opposing pressures of the train pipe and the chamber on the train line side of the triple valve piston, and a valve mechanism operated by said abutment for controlling the supply of fluid from the train pipe to said piston chamber, and from said chamber to the atmosphere.

16. In a fluid pressure brake, the combination with a triple valve, of a reducing valve device comprising differential diaphragms subject to the opposing pressures of the train pipe and the chamber on the train line side of the triple valve piston, and valve mechanism operated by said diaphragms for controlling the pressure in said chamber.

In testimony whereof I have hereunto set my hand.

CLYDE C. FARMER.

Witnesses:
 ARTHUR L. HUMPHREY,
 MAUDE C. THORPE.